US009405730B1

(12) United States Patent
Yeo

(10) Patent No.: US 9,405,730 B1
(45) Date of Patent: *Aug. 2, 2016

(54) SYSTEMS AND METHODS FOR A SIGNED MAGNITUDE ADDER IN ONE'S COMPLEMENT LOGIC

(71) Applicant: MARVELL INTERNATIONAL LTD., Hamilton (BM)

(72) Inventor: Engling Yeo, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 295 days.

This patent is subject to a terminal disclaimer.

(21) Appl. No.: 14/246,773

(22) Filed: Apr. 7, 2014

Related U.S. Application Data

(63) Continuation of application No. 11/805,362, filed on May 22, 2007, now Pat. No. 8,713,085.

(60) Provisional application No. 60/809,747, filed on May 31, 2006.

(51) Int. Cl.
*G06F 7/50* (2006.01)
*G06F 17/10* (2006.01)

(52) U.S. Cl.
CPC .......... *G06F 17/10* (2013.01); *G06F 7/50* (2013.01); *G06F 2207/3836* (2013.01)

(58) Field of Classification Search
CPC .............................................. G06F 2207/3836
See application file for complete search history.

(56) References Cited

U.S. PATENT DOCUMENTS

| 3,380,027 | A | | 4/1968 | Kamm et al. |
| 3,970,833 | A | * | 7/1976 | Gehweiler .............. G06F 7/505 708/190 |
| 4,099,248 | A | | 7/1978 | Borgerson et al. |
| 4,298,952 | A | | 11/1981 | Guenthner et al. |
| 5,159,568 | A | | 10/1992 | Adiletta et al. |
| 5,267,187 | A | | 11/1993 | Hsieh et al. |
| 5,546,335 | A | | 8/1996 | Lee |
| 6,343,306 | B1 | | 1/2002 | Lo |
| 6,473,529 | B1 | | 10/2002 | Lin |
| 6,523,050 | B1 | | 2/2003 | Dhablania et al. |
| 6,671,734 | B1 | | 12/2003 | Shimizu |

FOREIGN PATENT DOCUMENTS

EP         0626638 A1 * 11/1994   .............. G06F 7/508

OTHER PUBLICATIONS

Balabanian, Norman, and Bradley Carlson; "Digital Logic Design Principles"; Wiley, 2001.*
John Shedletsky, Comment on the Sequential and Indeterminate Behavior of an End-Around-Carry Adder, 1977, IEEE, pp. 271-272.
Andrew Tanenbaum, "Structured Computer Organization", 1984, Prentice-Hall, Second Edition, pp. 10-12.

(Continued)

*Primary Examiner* — Matthew Sandifer

(57) ABSTRACT

Disclosed herein are systems and methods for a signed-magnitude adder based on one's complement logic, where the adder offers enhancements in both speed and chip area consumption. The one's complement based adder includes circuitry for converting operands from their signed-magnitude representations to their one's complement representations, circuitry for adding operands in their one's complement representations, and circuitry for converting the resulting sum into a signed-magnitude format.

14 Claims, 9 Drawing Sheets

(56) References Cited

OTHER PUBLICATIONS

Tutorial: Twos Complement Numbers, Sep. 19, 2002, Rocky Mountain Computer Consulting Inc, pp. 1-7.
Andrew Tanenbaum, Structured Computer Organization, 1984, Prentice-Hall International Inc, pp. 10-12.
Gergen et al., Novel Digital Signal Processing Architecture with Microcontroller Features, Freescale Superconductor, Revision 1, 2005, pp. 1-20.
UAF Department of Computer Science, CS 301 Class Notes, http://www.cs.uaf.eduJ2000/fa1L/cs3O 1 /notes/Cha ter4/node4.html, 2 pages.
Jaehong Park et al., 470ps 64bit Parallel Binary Adder, 2000 Symposium on VLSI Circuits, Digest of Technical Papers, 2 pages.
Jan M. Rabacy et al., Digital Integrated Circuits: A Design Perspective, 2d ed., Prentice Hall, § 11.3, pp. 561-570.
Yasuhisa Shimazaki et al., A Shared-Well Dual-Supply-Voltage 64-bit ALU, ISSCC 2003, Session 6, Low-Power Digital Techniques, Paper 6.2.

* cited by examiner

SYSTEMS AND METHODS FOR A SIGNED MAGNITUDE ADDER IN ONE'S COMPLEMENT LOGIC

CROSS REFERENCE TO RELATED APPLICATION

This application is a continuation of U.S. patent application Ser. No. 11/805,362, filed May 22, 2007 (currently allowed), which claims the benefit under 35 U.S.C. §119(e) of U.S. Provisional Application No. 60/809,747, filed May 31, 2006, each of which is hereby incorporated by reference herein in its entirety.

BACKGROUND OF THE INVENTION

One of the basic functions in the operation of virtually all computer systems is the capability of adding two integers together. Having an addition function is essential because not only is addition used to provide numerical sums to users, it is also used in the implementation of numerous logic functions internal to the computer systems. Hence, one or more adders are typically found in the arithmetic logic unit of a computer's microprocessor.

As such, when two bits are added together, the result is a sum of those two bits plus a carry to the next, or leftward, position. Thus, the addition of multiple bits can be effectuated by using carry-out of one set of bits for carrying into the neighboring set of bits to its left. For example, the binary addition of the two bits "11" and "01" is performed by first adding together the two least significant, or rightmost, bits "1" and "1." The result is a sum of "0" with a carry-out bit "1." The carry-out bit is accounted for as a carry bit to the addition of the next set of bits, "0" and "1." The result is a sum of "0" with a carry-out of "1." This yields a final correct answer of "100" (i.e., 3+1=4).

As known to those skilled in the art, this type of adder is known as a ripple-carry adder because the addition function involves rippling the carry bit, which can be either "1" or "0," all the way from the rightmost bit to the leftmost bit. One problem, however, associated with this type of adder is that it takes time to ripple the carry signal. In some cases, two levels of logic are implemented in computing the carry-out from a carry-in. Hence, if the least significant bit generates a carry which is propagated through the length of the adder, the signal passes through 2n levels of logic, with n being the length of the adder, before the last gate can determine whether there is a carry-out of the most significant bit. An example of such length-wide ripple effect is the addition of the binary numbers "101 . . . 111" and "000 . . . 001."

In general, the time a circuit takes to produce an output is proportional to the maximum number of logic levels through which the signal travels, which constitutes a "critical path" of the circuit. This propagation delay is especially severe for cases involving the addition of large numbers having multiple bits, which frequently occurs in a circuit, such as a microprocessor. For example, a substantial amount of time is required to ripple a carry through the entire addition chain of two 32-bit words. Consequently, the time required to ripple the carry retards the critical time path, thereby slowing down the overall speed of the microprocessor. This detrimentally impacts the performance of a computer system.

However, ripple-carry adders are widely used in today's digital signal processing (DSP) applications because additions in these applications are most efficiently implemented using this type of adders. DSP technology serves the basis for devices such as mobile phones, multimedia computers, video recorders, CD players, etc., and will soon replace analog circuitry in television sets and telephones. Therefore, ripple-carry adders are an essential component in today's electronic devices.

Hence, it would be desirable to provide improved methods and systems for executing additions on ripple-carry adders that optimize their computational efficiency.

SUMMARY OF THE INVENTION

The present invention relates to systems and methods for a signed magnitude adder based on one's complement logic for optimally and efficiently performing addition operations in the digital domain.

According to one aspect of the invention, the operands to be added by a signed magnitude adder of the present invention are represented in the signed-magnitude domain. The adder operates by first converting the operands to their one's complement representations before adding them to produce a sum that is also in the one's complement domain. If an overflow bit is generated during the addition, this bit is removed from the sum and added to the sum at its least significant bit position. If a negative sum is subsequently produced, the magnitude bits of the sum are inverted in order to accurately convert the sum to its signed-magnitude representation.

In certain implementations, a two's complement ripple-carry adder is used to handle the adding of operands in their one's complement domain. In certain implementations, the signed magnitude adder based on one's complement logic is used in a digital signal processing application and the bit-width of the operands to be added are no more than ten.

DETAILED DESCRIPTION OF THE INVENTION

The present invention provides systems and methods for a signed magnitude adder based on one's complement logic for optimally and efficiently performing addition operations in digital domain.

In general binary numbers are represented in a signed-magnitude format in most computer systems. Hence, signed-magnitude adders are needed to perform addition operations in those systems. Conventional signed-magnitude adders operate by first converting the operands into their two's complement representations before performing additions of these operands using two's complement logic. The resulting sum is then converted from its two's complement format to its signed-magnitude format.

Figure 1:
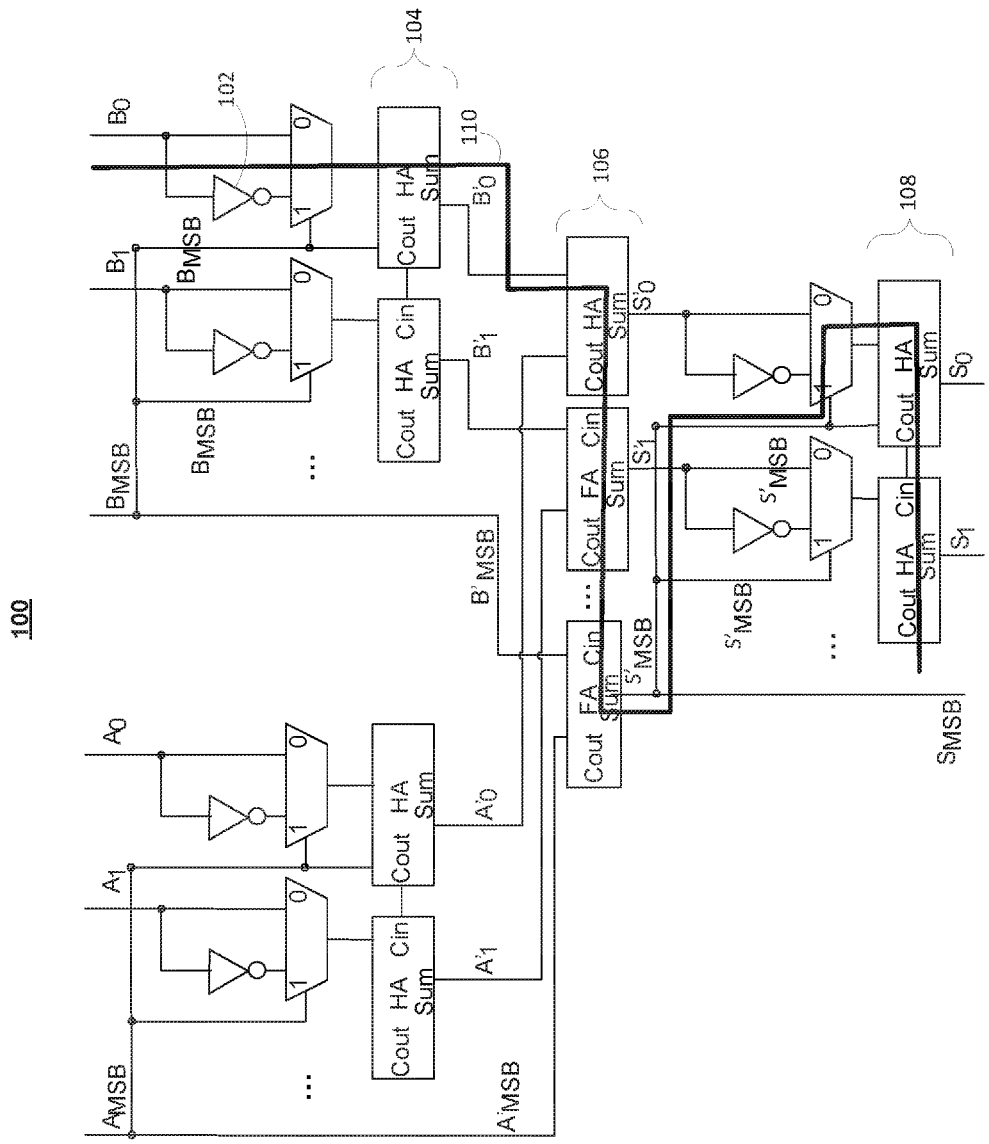
FIG. 1 is an illustrative embodiment of a conventional signed magnitude adder implementation using two's complement logic.

FIG. 1 provides a conventional hardware implementation of signed magnitude adder 100 based on a two's complement logic. According to the signed-magnitude format, a single bit is allocated as a sign bit to represent the sign of a number, where this bit is set to 0 for a positive number and set to 1 for a negative number. This sign bit is typically the most significant, or leftmost, bit in a binary number stream. The remaining bits in the number indicate its magnitude, or absolute value.

According to the illustrative implementation of FIG. 1, any negative operand is first converted from its signed-magnitude representation to a two's complement format by inverting its magnitude bits via, for example, inverter 102, and adding a value of 1 to the inverted operand at half adder 104. The signed-magnitude representation of a positive operand is the same as its two's complement representation.

Subsequently, these operands in the two's complement format undergo addition at, for example, traditional two's complement adder 106, as illustrated in FIG. 1. This illustrative two's complement adder 106 includes a series of full adders (FA) and one half adder (HA), where the number of full adders is one less than the number of bits in the operands.

If a negative sum is produced from the addition operation at adder 106, as indicated by the sum's sign bit being 1, another round of bit-inversion of all the bits in the sum is required and followed by an addition of 1 so as to accurately convert the two's complement sum to its signed-magnitude representation. Half adder 108 may be used to perform such add-by-1 operation.

In FIG. 1, the path traced by line 110 represents an exemplary critical time path for an operation using signed magnitude adder 100. It can be seen that critical path 110 includes two inversion delays and two add-by-1 operations. The first inversion delay and the first add-by-1 operation are both associated with converting a negative operand from its signed-magnitude format to its two's complement representation. The second inversion delay and the second add-by-1 operation both involve the conversion of a negative sum from its two's complement representation to its signed-magnitude format. Moreover, critical time path 110 also includes a two's complement adder operation using adder 106 for adding the operands in the two's complement domain. In particular, adder 106 has a series of N bit-wise adders, where N is a bit-width of the operands.

The implementation of FIG. 1 is now illustrated by an exemplary addition operation applied to two operands A and B in the signed-magnitude format, where A is a positive number and B is a negative number. For example, provided that B is "1110" (−6) in the signed magnitude representation, its two's complement representation is thus 1001+1, or 1010. The flipping of B's magnitude bits and its subsequent increment by 1 may be performed at inverter 102 and half adder 104, respectively, of FIG. 1. In addition, provided that A is "0100" (4), its two's complement representation remains the same as its signed magnitude format. Hence, The sum of A and B in the two's complement domain is "1110". This addition operation may be perform at adder 106. The resulting two's complement sum, when converted to signed-magnitude domain, becomes "1001+1", or "0010" (−2). The final add-by-1 operation may be performed by half adder 108 of FIG. 1.

Figure 2:
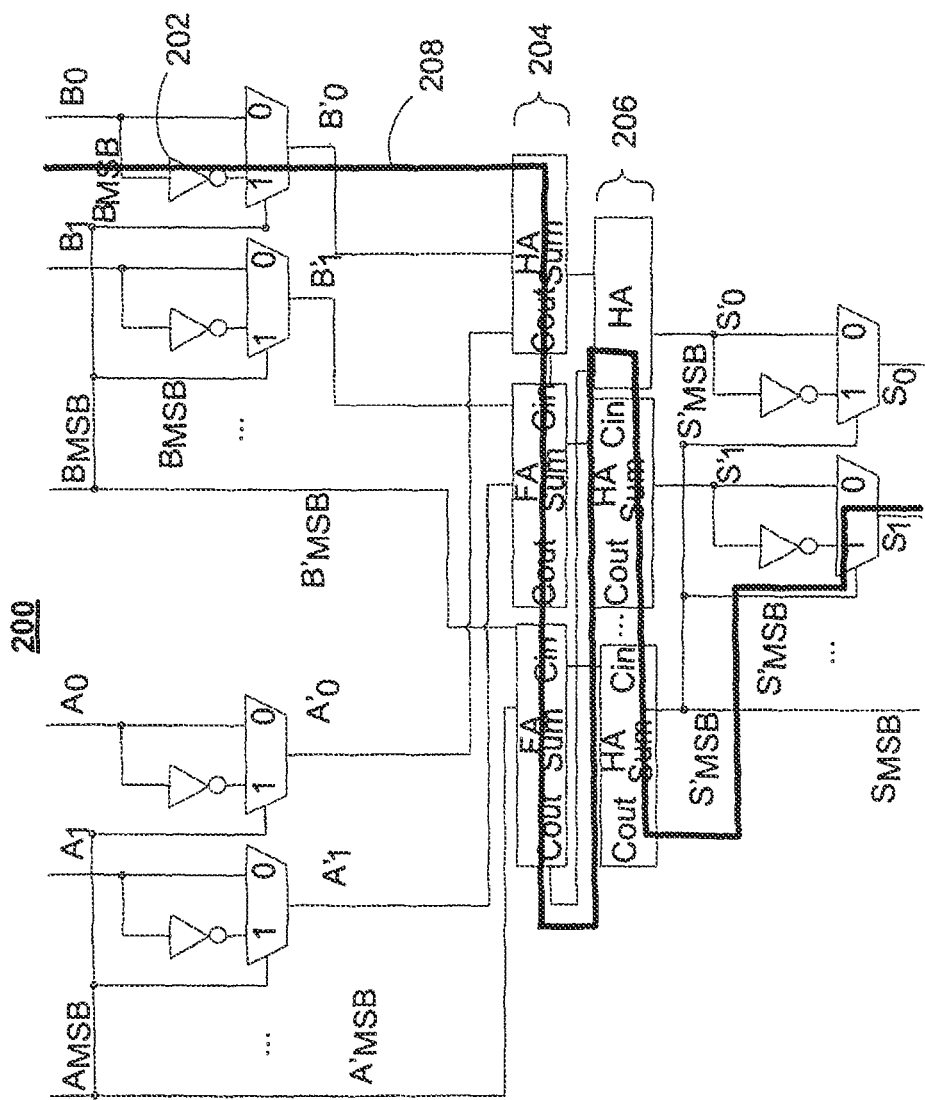
FIG. 2 is an illustrative embodiment of a signed magnitude adder implementation using one's complement logic, according to the present invention.

FIG. 2 provides an illustrative embodiment of signed magnitude adder 200 implemented based on one's complement logic, according to one aspect of the invention. First, any negative operand involved in the addition operation is converted from its signed-magnitude format to a one's complement representation by flipping the operand's magnitude bits using operand conversion circuitry, which may include inverter 202.

Subsequently, the one's complement operands undergo addition at, for example, a traditional two's complement adder 204, as illustrated in FIG. 2. In particular, adder 204 includes a series of full adders (FA) and one half adder (HA).

If an overflow is generated from the two's complement addition operation at adder 204, the overflow bit is removed from the resulting sum and added to the sum at its least significant bit location, or the rightmost bit. This addition is implemented by adder 206 which includes a series of half adders (HA).

If the addition operation produces a negative sum in the one's complement domain, as indicated by the sum's most significant bit being 1, a final round of flipping of the sum's magnitude bits accurately converts the sum from its one's complement format to a signed-magnitude representation.

FIG. 2 provides an exemplary critical time path for an operation using adder 200, as traced through by line 208. In particular, critical time path 208 includes two inversion delays associated with converting a negative number from its sign-magnitude representation to its one's complement representation and converting a negative sum from its one's complement representation to its sign-magnitude representation. Critical time path 208 also includes a two's complement adder for performing addition of operands in their one's complement representation. Moreover, critical time path 208 includes an add-by-1 operation for incrementing the final sum by 1 in the case that an overflow bit is generated.

The implementation of FIG. 2 is now illustrated by the same example involving A and B as above, where A is "0100" (4) and B is "1110" (−6), both of which are in the signed-magnitude domain. These numbers are first converted to their one's complement representation, thus producing "0100" for A and "1001" for B. The bit-wise inversion of B's magnitude bits may be performed by inverter 202 of FIG. 1. The one's complement representations of A and B are subsequently added at, for example, adder 204, to produce a sum of "1101" in the one's complement domain. Since this sum has a negative value, as indicated by the sum's most significant bit being 1, a final round of flipping of its magnitude bits is required to convert the sum from its one's complement format to a signed-magnitude representation. Thus, the sum of A and B is "1010" (−2).

Figure 3:
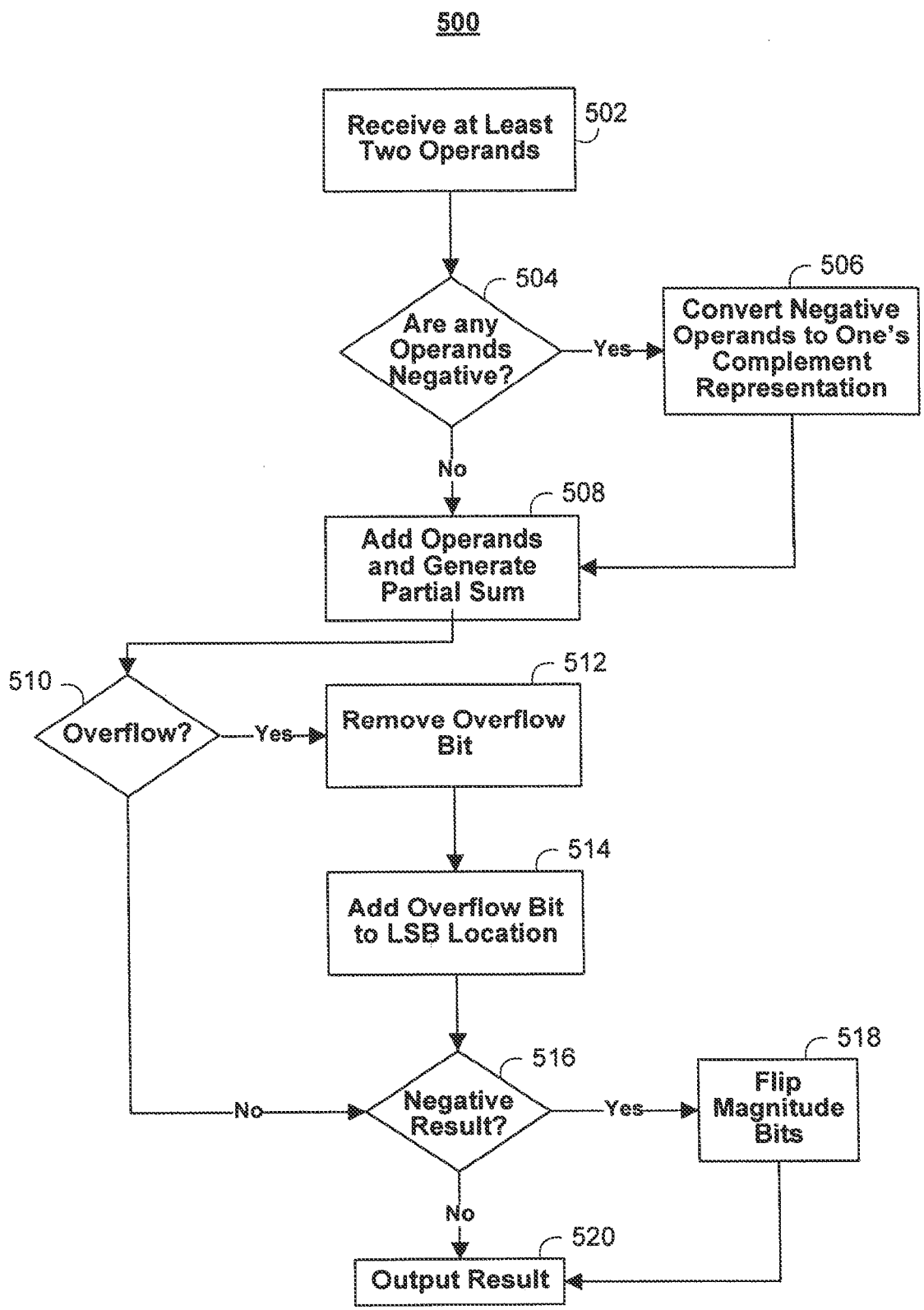
FIG. 3 is a flow diagram of an illustrative process for performing an addition operation using the signed magnitude adder of FIG. 2.

FIG. 3 is a flow diagram showing illustrative process 500 for performing an addition operation based on one's complement logic provided, for example, by the adder of FIG. 2. According to illustrative process 500, adder 200 operates by first receiving, at step 502, at least two operands to be added. At step 504, a determination is made whether any of the received operands are negative in value. If at least one of the received operands is negative in value, the negative operand(s) in their signed-magnitude format are converted to their one's complement representations at step 506 using, for example, inverter 202 of FIG. 2. Otherwise, no inversion is necessary because a positive value's one's complement representation is the same as its signed-magnitude representation. Subsequently, the one's complement operands are added together at step 508. A partial sum, also in the one's complement domain, is thus generated from such addition. If an overflow bit is produced for the partial sum, as determined by step 510, the overflow bit is removed from the partial sum at step 512 and added to the partial sum at its least significant bit location at step 514. At step 516, it is then determined if the resulting partial sum is a negative value. If the resulting sum is negative, the magnitude bits of the partial sum are flipped at step 518 to generate a final sum at step 520. Otherwise, if the partial sum is a positive value, this partial sum becomes the final sum at step 520 without performing any additional magnitude-bit flipping.

In comparing the traditional signed magnitude adder 100 of FIG. 1 to signed magnitude adder 200 (FIG. 2) of the present invention, where adder 100 is based on two's complement logic and adder 200 is based on one's complement logic, it can be seen that the latter provides improvements in both critical time path and chip area consumption.

In one aspect, the number of add-by-1 operations performed in adder 100 is equal to the number of operands involved in the addition. For example, two add-by-1 operations are required for the addition of A and B since there are two operands that are being added. Thus, the number of add-by-1 operations grows linearly with the number of operands in adder 100. On the other hand, for one's complement-based adder 200, the number of add-by-1 operations needed is a constant value of 1, regardless of how many operands there are in the addition operation. This overhead of the add-by-1 computation in two's complement-based adder 100 is significant in typical digital signal processing (DSP) applications which allocate only a limited number of bits (e.g., 5) to represent their internal variables.

In one implementation, a ripple-carry adder architecture is used to implement adder operations 106 and 204 of FIGS. 1 and 2, respectively. As mentioned above, most application-specific DSP requirements make use of a small number of bits to represent their internal variables. Moreover, a bit-width for an internal variable of a DSP application is generally less than 10. Hence, due to the limited bit-width concern, ripple-carry adder designs are preferred over the other adders.

It can be shown that the maximum ripple lengths of the two adder designs differ by a factor of 2 despite the fact that critical time paths 110 and 208 for the respective adders both trace through N−1 full adders (FA) and N+1 half adders (HA), where N is an exemplary operand bit-width. The explanation consists of the following: first consider a pair of operands A' and B' that give rise to a maximum ripple distance without producing an overflow. For example, A' may be "101 ... 111" and B' may be "000 ... 001", both of which are in the two's complement domain. The sum of this critical-path addition, S', is then "110 ... 000." Since S' is a negative value based on its most significant bit being 1, its conversion to a signed-magnitude representation requires flipping its magnitude bits, generating 101 ... 111, and subsequently added by 000 ... 001, which initiates another round of maximum ripple length addition. Hence, the total ripple distance of this operation is 2N−2, where N is the bit width of operands A' and B'.

Now consider a pair of operands A" and B" that give rise to a maximum ripple distance in a one's complement-based adder, such as adder 200 of FIG. 2. For example, A" may be "111 ... 111" and B" may be "000 ... 001," both of which are in the one's complement domain. Subsequent to their addition in the one's complement domain, an overflow bit of 1 is produced for the partial sum "000 ... 000" This overflow bit is then added to the partial sum to produce the result "000 ... 001". Note that this step does not initiate any ripple-through effects as seen above in the maximum-ripple-addition via two's complement-based adder 100. This also demonstrates that adding the overflow bit back to the partial sum in the one's complement domain will not incur any ripple delays. Hence, the maximum ripple distance for the operation is only N.

In certain embodiments, other adder architectures may be used to implement the adder designs of FIGS. 1 and 2. Some possible adder architectures include, for example, a Manchester look-ahead adder, a carry-save look-ahead adder, a radix-4 adder, etc.

Figure 4:
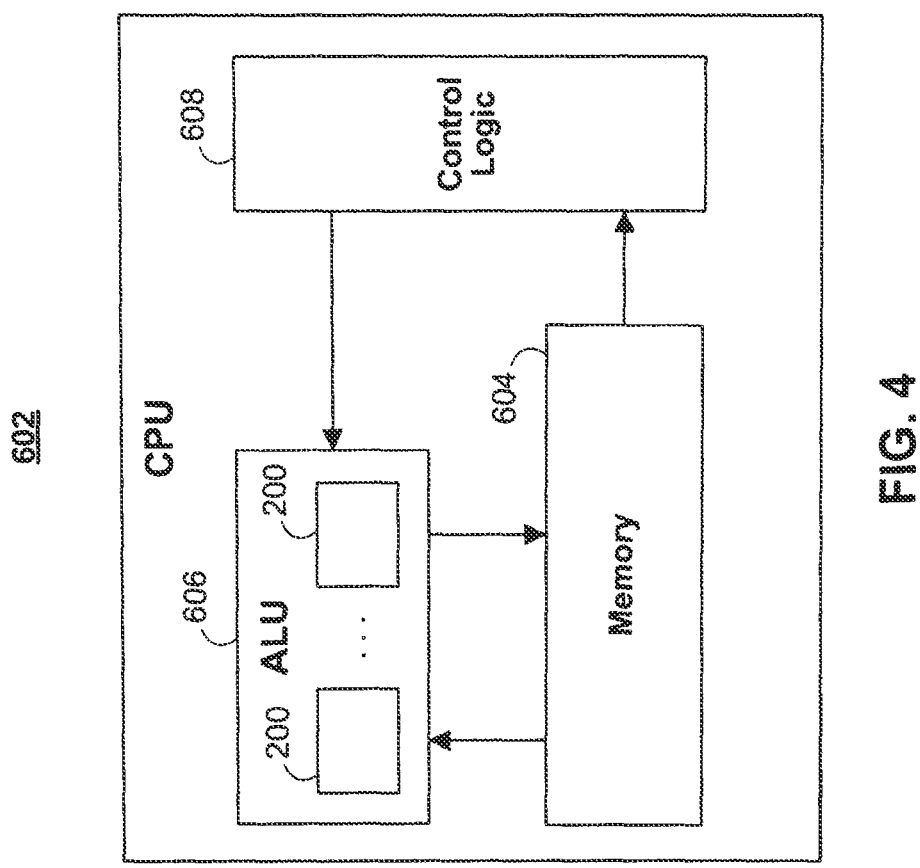
FIG. 4 is a block diagram of an exemplary central processing unit that includes the signed magnitude adder of FIG. 2.

FIG. 4 shows an exemplary block diagram of central-processing unit (CPU) 602 that may include one or more instances of one's complement based signed-magnitude adder 200 of FIG. 2. In particular, one or more instances of adder 200 may be incorporated in arithmetic logic unit (ALU) 606 of CPU 602. CPU 602 may include all the standard components of a CPU or processor, including various registers, instruction memory and data memory (shown generally as memory 604 in FIG. 4), and control logic 608. CPU 602 may be implemented in a variety of electronic devices, including high-definition televisions (HDTV) and cellular telephones, as described below.

Referring now to FIGS. 5A-5E, various exemplary implementations of the present invention are shown.

Figure 5A:
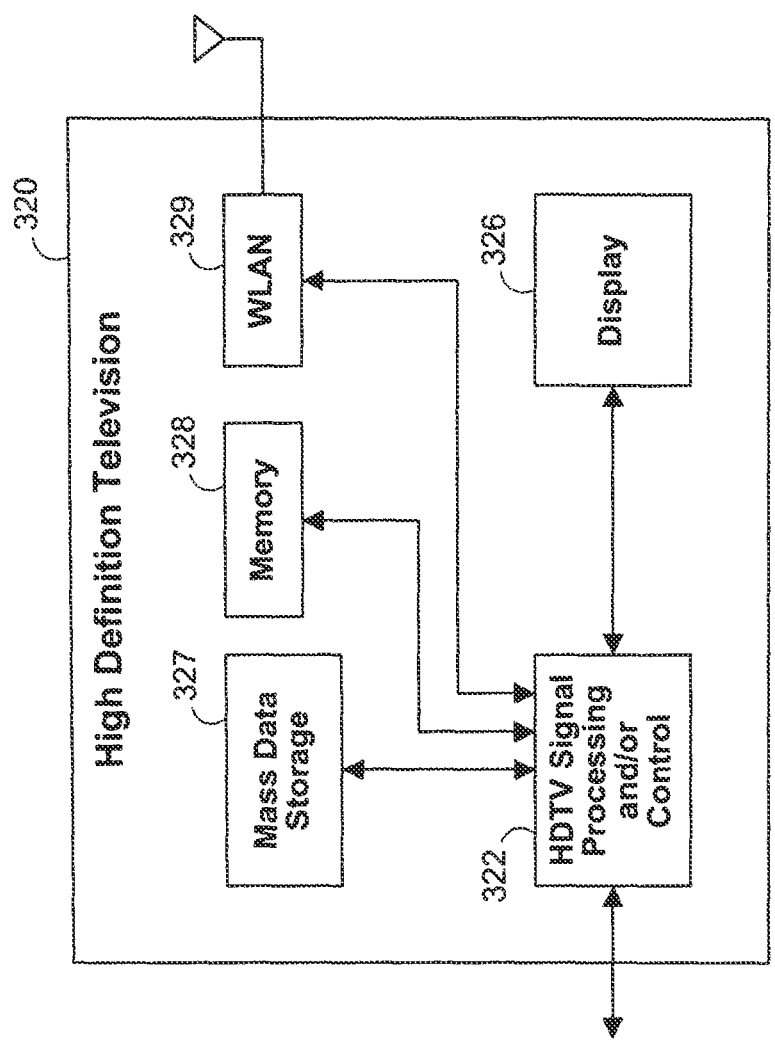
FIG. 5A is a block diagram of an exemplary high definition television that can employ the disclosed technology.

Referring now to FIG. 5A, the present invention can be implemented in a high definition television (HDTV) 320. The present invention may implement either or both signal processing and/or control circuits, which are generally identified in FIG. 5A at 322, a WLAN interface 329 and/or mass data storage 327 of the HDTV 320. The HDTV 320 receives HDTV input signals in either a wired or wireless format and generates HDTV output signals for a display 326. In some implementations, signal processing circuit and/or control circuit 322 and/or other circuits (not shown) of the HDTV 320 may process data, perform coding and/or encryption, perform calculations, format data and/or perform any other type of HDTV processing that may be required.

The HDTV 320 may communicate with mass data storage 327 that stores data in a nonvolatile manner such as optical and/or magnetic storage devices including hard disk drives (HDDs) and digital versatile disk (DVD) drives. The HDD may be a mini HDD that includes one or more platters having a diameter that is smaller than approximately 1.8". The HDTV 320 may be connected to memory 328 such as RAM, ROM, low latency nonvolatile memory such as flash memory and/or other suitable electronic data storage. The HDTV 320 also may support connections with a WLAN via the WLAN interface 329.

Figure 5B:
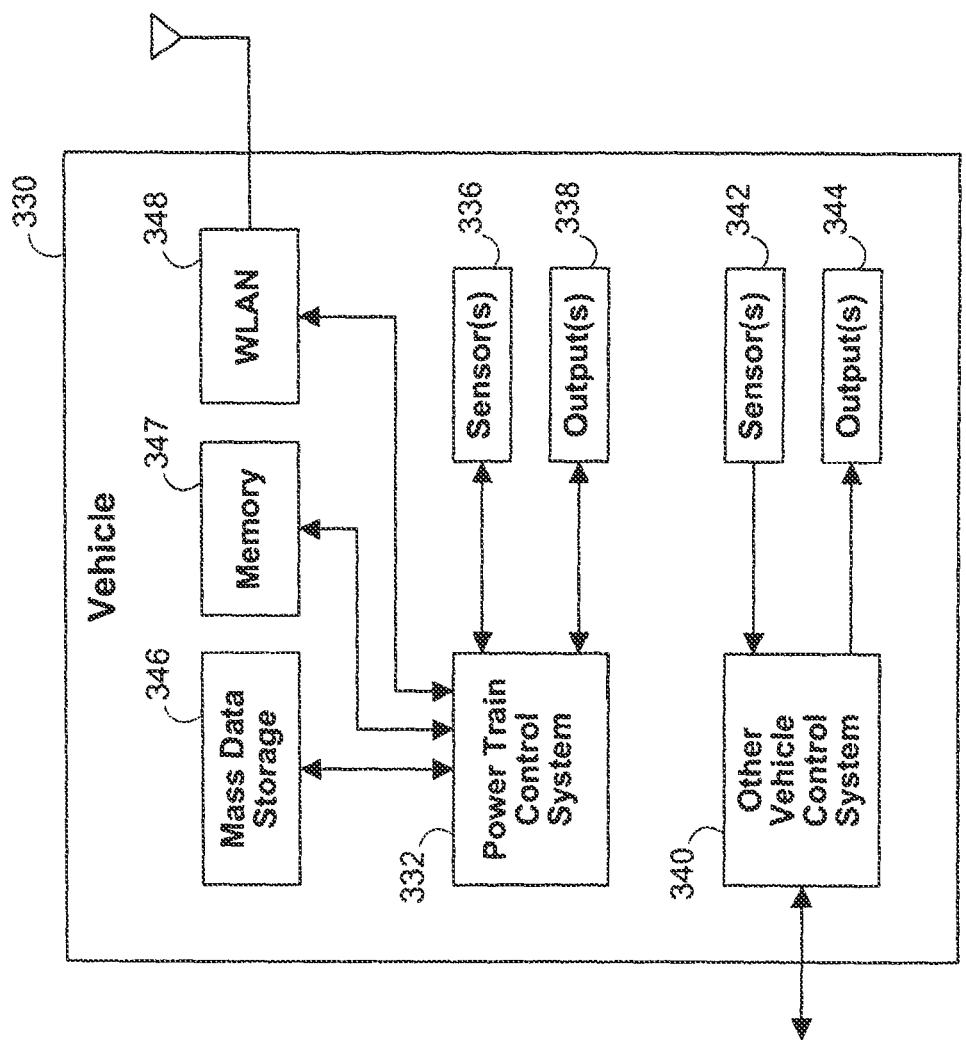
FIG. 5B is a block diagram of an exemplary vehicle that can employ the disclosed technology.

Referring now to FIG. 5B, the present invention implements a control system of a vehicle 330, a WLAN interface 348 and/or mass data storage 346 of the vehicle control system. In some implementations, the present invention may implement a powertrain control system 332 that receives inputs from one or more sensors 336 such as temperature sensors, pressure sensors, rotational sensors, airflow sensors and/or any other suitable sensors and/or that generates one or more output control signals 338 such as engine operating parameters, transmission operating parameters, and/or other control signals.

The present invention may also be implemented in other control systems 340 of the vehicle 330. The control system 340 may likewise receive signals from input sensors 342 and/or output control signals to one or more output devices 344. In some implementations, the control system 340 may be part of an anti-lock braking system (ABS), a navigation system, a telematics system, a vehicle telematics system, a lane departure system, an adaptive cruise control system, a vehicle entertainment system such as a stereo, DVD, compact disc and the like. Still other implementations are contemplated.

The powertrain control system 332 may communicate with mass data storage 346 that stores data in a nonvolatile manner. The mass data storage 346 may include optical and/or magnetic storage devices such as hard disk drives (HDDs) and/or DVD drives. The HDD may be a mini HDD that includes one or more platters having a diameter that is smaller than approximately 1.8". The powertrain control system 332 may be connected to memory 347 such as RAM, ROM, low latency nonvolatile memory such as flash memory and/or other suitable electronic data storage. The powertrain control system 332 also may support connections with a WLAN via the WLAN interface 348. The control system 340 may also include mass data storage, memory and/or a WLAN interface (all not shown).

Figure 5C:
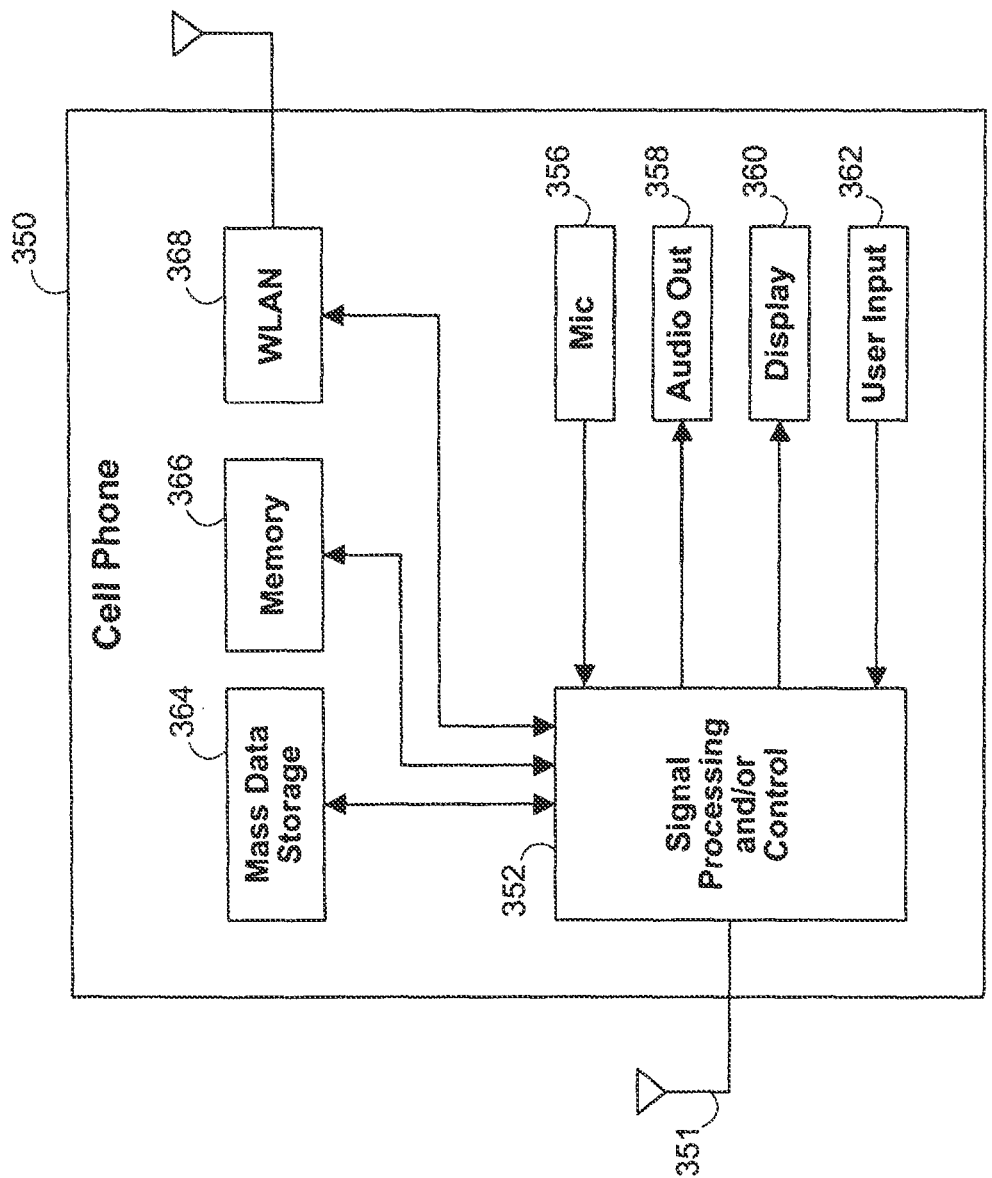
FIG. 5C is a block diagram of an exemplary cell phone that can employ the disclosed technology.

Referring now to FIG. 5C, the present invention can be implemented in a cellular phone 350 that may include a cellular antenna 351. The present invention may implement either or both signal processing and/or control circuits, which are generally identified in FIG. 5C at 352, a WLAN interface 368 and/or mass data storage 364 of the cellular phone 350. In some implementations, the cellular phone 350 includes a microphone 356, an audio output 358 such as a speaker and/or audio output jack, a display 360 and/or an input device 362 such as a keypad, pointing device, voice actuation and/or other input device. The signal processing and/or control circuits 352 and/or other circuits (not shown) in the cellular phone 350 may process data, perform coding and/or encryption, perform calculations, format data and/or perform other cellular phone functions.

The cellular phone 350 may communicate with mass data storage 364 that stores data in a nonvolatile manner such as optical and/or magnetic storage devices including hard disk drives (HDDs) and/or DVD drives. The HDD may be a mini HDD that includes one or more platters having a diameter that is smaller than approximately 1.8". The cellular phone 350 may be connected to memory 366 such as RAM, ROM, low latency nonvolatile memory such as flash memory and/or other suitable electronic data storage. The cellular phone 350 also may support connections with a WLAN via the WLAN interface 368.

Figure 5D:
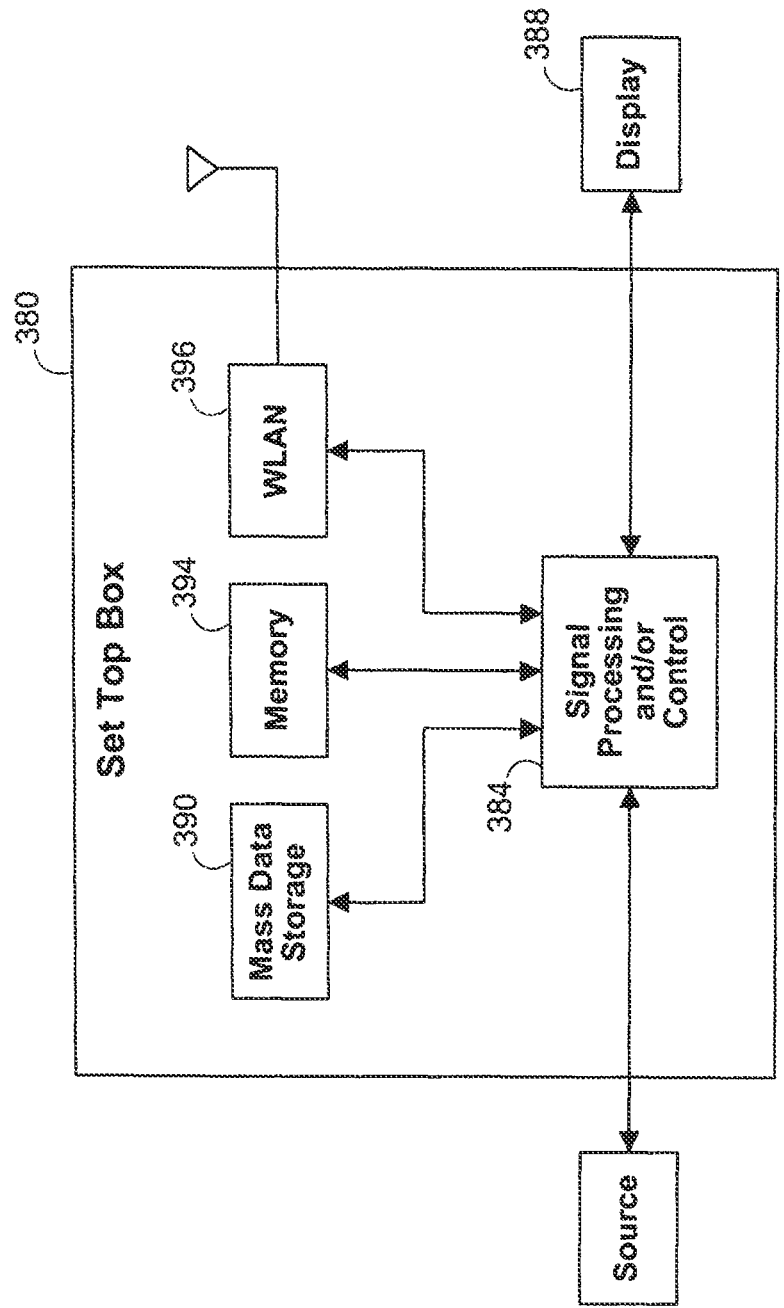
FIG. 5D is a block diagram of an exemplary set top box that can employ the disclosed technology.

Referring now to FIG. 5D, the present invention can be implemented in a set top box 380. The present invention may implement either or both signal processing and/or control circuits, which are generally identified in FIG. 5D at 384, a WLAN interface 396 and/or mass data storage 390 of the set top box 380. The set top box 380 receives signals from a source such as a broadband source and outputs standard and/or high definition audio/video signals suitable for a display 388 such as a television via monitor and/or other video and/or audio output devices. The signal processing and/or control circuits 384 and/or other circuits (not shown) of the set top box 380 may process data, perform coding and/or encryption, perform calculations, format data and/or perform any other set top box function.

The set top box 380 may communicate with mass data storage 390 that stores data in a nonvolatile manner. The mass data storage 390 may include optical and/or magnetic storage devices such as hard disk drives (HDDs) and/or DVD drives. The HDD may be a mini HDD that includes one or more platters having a diameter that is smaller than approximately 1.8". The set top box 380 may be connected to memory 394 such as RAM, ROM, low latency nonvolatile memory such as flash memory and/or other suitable electronic data storage. The set top box 380 also may support connections with a WLAN via the WLAN network 396.

Figure 5E:
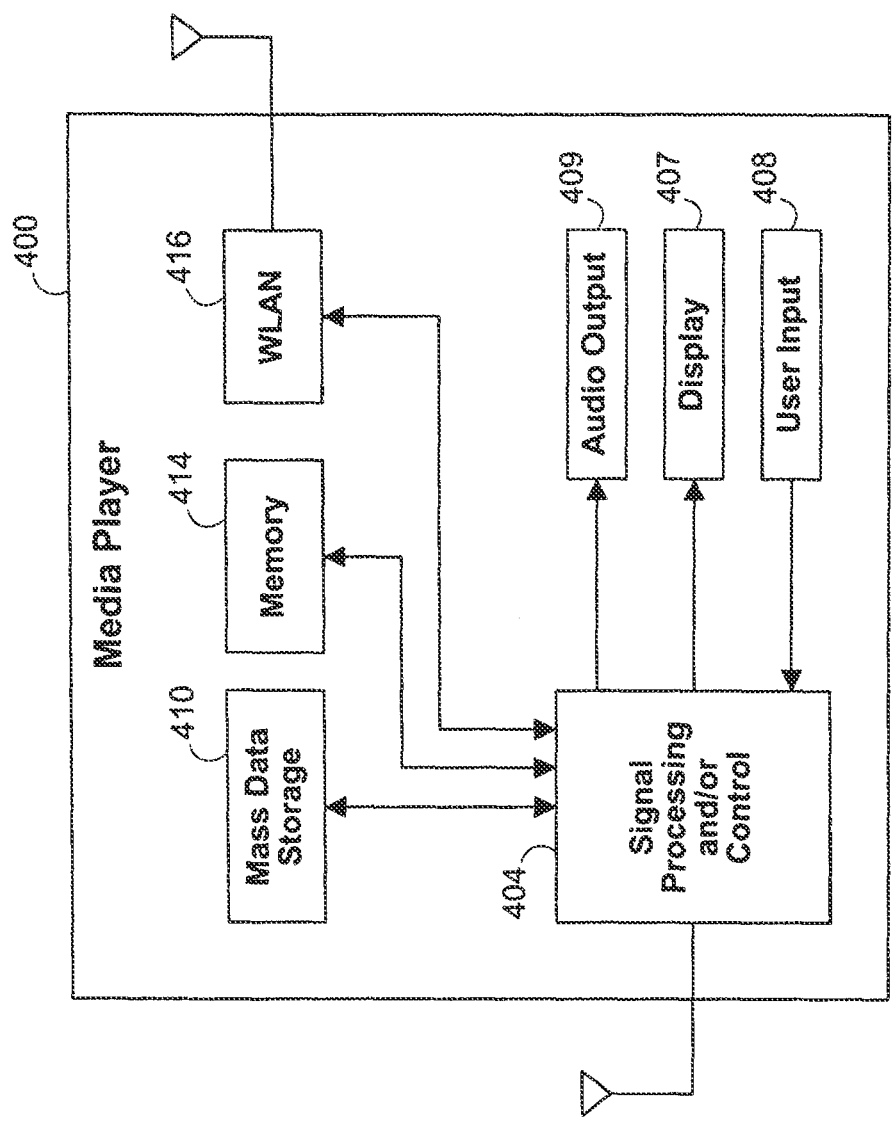
FIG. 5E is a block diagram of an exemplary media player that can employ the disclosed technology.

Referring now to FIG. 5E, the present invention can be implemented in a media player 400. The present invention may implement either or both signal processing and/or control circuits, which are generally identified in FIG. 5E at 404, a WLAN interface 43 and/or mass data storage 410 of the media player 400. In some implementations, the media player 400 includes a display 407 and/or a user input 408 such as a keypad, touchpad and the like. In some implementations, the media player 400 may employ a graphical user interface (GUI) that typically employs menus, drop down menus, icons and/or a point-and-click interface via the display 407 and/or user input 408. The media player 400 further includes an audio output 409 such as a speaker and/or audio output jack. The signal processing and/or control circuits 404 and/or other circuits (not shown) of the media player 400 may process data, perform coding and/or encryption, perform calculations, format data and/or perform any other media player function.

The media player 400 may communicate with mass data storage 410 that stores data such as compressed audio and/or video content in a nonvolatile manner. In some implementations, the compressed audio files include files that are compliant with MP3 format or other suitable compressed audio and/or video formats. The mass data storage 410 may include optical and/or magnetic storage devices such as hard disk drives (HDDs) and/or DVD drives. The HDD may be a mini HDD that includes one or more platters having a diameter that is smaller than approximately 1.8". The media player 400 may be connected to memory 414 such as RAM, ROM, low latency nonvolatile memory such as flash memory and/or other suitable electronic data storage. The media player 400 also may support connections with a WLAN via the WLAN interface 416. Still other implementations in addition to those described above are contemplated.

Thus it is seen that systems and methods for a one's complement adder is provided that offers enhancements in both speed and chip area consumption. One skilled in the art will appreciate that the invention can be practiced by other than the described embodiments, which are presented for purposes of illustration and not of limitation, and the present invention is limited only by the claims which follow.

What is claimed is:

1. A method for adding a first operand in a first one's complement representation and a second operand in a second one's complement representation, the method comprising:
    converting the first and second operand from a first and second signed-magnitude representation to the first and second one's complement representation;
    generating a sum of the first one's complement representation and the second one's complement representation using a plurality of full adders followed by a half adder;
    determining whether the sum includes an overflow bit;
    removing the overflow bit from the sum in response to determining that the sum includes the overflow bit;
    adding the removed overflow bit to the sum at a least significant position of the sum using a plurality of half adders; and
    converting the sum to a signed-magnitude representation in response to determining that the sum is negative valued.

2. The method of claim 1, wherein the half adder adds least significant bits from each of the first one's complement representation and the second one's complement representation.

3. The method of claim 1, wherein a total number of carry operations performed by the plurality of full adders, the half adder, and the plurality of half adders is less than or equal to one plus the number of bits in the first one's complement representation.

4. The method of claim 1, wherein converting the first and second operand from the first and second signed-magnitude representation to the first and second one's complement representation comprises flipping the first operand's magnitude bits and the second operand's magnitude bits using an inverter.

5. The method of claim 1, wherein a number of bits in the first and second operand is at most 10.

6. The method of claim 1, wherein the first operand is generated by a digital signal processing application, the method further comprising providing the sum to the digital signal processing application.

7. An adder for adding a first operand in a first one's complement representation and a second operand in a second one's complement representation, the adder comprising:
   first circuitry to convert the first and second operand from a first and second signed-magnitude representation to the first and second one's complement representation;
   second circuitry to generate a sum of the first one's complement representation and the second one's complement representation and to determine whether the sum includes an overflow bit, wherein the second circuitry comprises a plurality of full adders followed by a half adder;
   third circuitry to remove the overflow bit from the sum in response to determining that the sum includes the overflow bit;
   fourth circuitry to add the removed overflow bit to the sum at a least significant position of the sum, wherein the fourth circuitry comprises a plurality of half adders; and
   fifth circuitry to convert the sum to a signed-magnitude representation in response to determining that the sum is negative valued.

8. The adder of claim 7, wherein the half adder adds least significant bits from each of the first one's complement representation and the second one's complement representation.

9. The adder of claim 7, wherein a total number of carry operations performed by the plurality of full adders, the half adder, and the plurality of half adders is less than or equal to one plus the number of bits in the first one's complement representation.

10. The adder of claim 7, wherein the first and second operand are converted from the first and second signed-magnitude representation to the first and second one's complement representation by flipping the first operand's magnitude bits and second operand's magnitude bits using an inverter.

11. The adder of claim 7, wherein a number of bits in the first and second operand is at most 10.

12. The adder of claim 7, wherein the first operand is generated by a digital signal processing application, the adder is further configured to provide the sum to the digital signal processing application.

13. A device for adding a first operand in a first one's complement representation and a second operand in a second one's complement representation, the device comprising:
   means for converting the first and second operand from a first and second signed-magnitude representation to the first and second one's complement representation;
   means for generating a sum of the first one's complement representation and the second one's complement representation using a plurality of full adders followed by a half adder, and
   for determining whether the sum includes an overflow bit;
   means for removing the overflow bit from the sum in response to determining that the sum includes the overflow bit;
   means for adding the removed overflow bit to the sum at a least significant position of the sum using a plurality of half adders; and
   means for converting the sum to a signed-magnitude representation in response to determining that the sum is negative valued.

14. The device of claim 13, wherein the half adder adds least significant bits from each of the first one's complement representation and the second one's complement representation.

* * * * *